(12) United States Patent
Eguchi et al.

(10) Patent No.: US 10,520,396 B2
(45) Date of Patent: Dec. 31, 2019

(54) METHOD FOR ESTIMATING LOAD MODEL IN TIRE UNIFORMITY TESTER

(71) Applicant: KOBE STEEL, LTD., Hyogo (JP)

(72) Inventors: Toru Eguchi, Hyogo (JP); Yoshiharu Nishida, Hyogo (JP); Yoshiaki Matsubara, Hyogo (JP); Yasuhiro Matsushita, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 351 days.

(21) Appl. No.: 15/510,522

(22) PCT Filed: Sep. 29, 2015

(86) PCT No.: PCT/JP2015/077636
§ 371 (c)(1),
(2) Date: Mar. 10, 2017

(87) PCT Pub. No.: WO2016/056433
PCT Pub. Date: Apr. 14, 2016

(65) Prior Publication Data
US 2017/0284900 A1    Oct. 5, 2017

(30) Foreign Application Priority Data

Oct. 9, 2014 (JP) ................ 2014-208109

(51) Int. Cl.
| | | |
|---|---|---|
| *G01M 17/02* | (2006.01) | |
| *G01M 1/28* | (2006.01) | |
| *B29D 30/00* | (2006.01) | |

(52) U.S. Cl.
CPC ....... *G01M 17/022* (2013.01); *B29D 30/0061* (2013.01); *G01M 1/28* (2013.01); *B29D 2030/0066* (2013.01)

(58) Field of Classification Search
CPC .......... G01M 1/16; G01M 17/02; G01M 1/28; G01M 17/022; B29D 30/0061; B29D 2030/0635; B29D 2030/0066
See application file for complete search history.

(56) References Cited

U.S. PATENT DOCUMENTS

| | | | | |
|---|---|---|---|---|
| 4,702,287 A | * | 10/1987 | Higbie ................ | B60S 5/046 141/4 |
| 2001/0007208 A1 | * | 7/2001 | Colarelli, III ........ | G01M 1/225 73/462 |

(Continued)

FOREIGN PATENT DOCUMENTS

| | | |
|---|---|---|
| EP | 0 265 036 A1 | 4/1988 |
| EP | 1 134 573 A2 | 9/2001 |

(Continued)

OTHER PUBLICATIONS

International Search Report (ISR) dated Dec. 28, 2015 from corresponding Appl No. PCT/JP2015/077636, with English translation, 3 pp.

(Continued)

*Primary Examiner* — Stephanie E Bloss
(74) *Attorney, Agent, or Firm* — Studebaker & Brackett PC (57) ABSTRACT

A tire uniformity testing apparatus (1) measures uniformity of a tire (T) by measuring a load generated on the tire (T) pressed against a rotating rotary drum (2). A load model used to control a pressing position of the rotary drum (2) and express a relation between the pressing position of the tire (T) against the rotary drum (2) and a tire load generated in the tire (T) is configured to successively measure the tire load, while changing the pressing position of the tire (T) against the rotary drum (2), and to estimate the tire load using the measured value of the measured tire load.

2 Claims, 9 Drawing Sheets

(56) References Cited

U.S. PATENT DOCUMENTS

| | | | | |
|---|---|---|---|---|
| 2005/0065666 | A1* | 3/2005 | Miyashita | B60C 19/00 701/1 |
| 2007/0100576 | A1* | 5/2007 | Obunai | G01M 17/02 702/145 |
| 2009/0293603 | A1* | 12/2009 | Douglas | G01B 21/12 73/146 |
| 2010/0114449 | A1* | 5/2010 | Shiozawa | B60L 3/10 701/90 |
| 2010/0263440 | A1* | 10/2010 | Berry | G01M 17/02 73/146 |
| 2011/0113875 | A1* | 5/2011 | Okada | G01M 17/022 73/146 |
| 2012/0079868 | A1* | 4/2012 | Okada | G01L 25/00 73/1.15 |
| 2014/0230535 | A1* | 8/2014 | Okada | G01M 17/02 73/146 |

FOREIGN PATENT DOCUMENTS

| | | |
|---|---|---|
| EP | 1 239 275 A2 | 9/2002 |
| JP | H06-95057 B2 | 11/1994 |
| JP | 2006-308320 A | 11/2006 |
| JP | 2013-124858 A | 6/2013 |

OTHER PUBLICATIONS

Written Opinion dated Dec. 28, 2015 from corresponding Appl No. PCT/JP2015/077636, with English translation, 7 pp.

The extended European search report issued by the European Patent Office dated May 4, 2018, which corresponds to EP15848498.0-1014 and is related to U.S. Appl. No. 15/510,522.

\* cited by examiner

METHOD FOR ESTIMATING LOAD MODEL IN TIRE UNIFORMITY TESTER

TECHNICAL FIELD

The present invention relates to a method for estimating a load model which expresses a relation between a pressing position of a tire against a rotary drum and a tire load generated in the tire in a tire uniformity testing apparatus.

BACKGROUND ART

In the related art, a tire uniformity test for determining good or bad by measuring tire uniformity (uniformity of a tire) and the like has been performed on tires as finished products. For example, in the case of measuring the tire uniformity for a tire for a passenger car, the test is performed using the testing apparatus as illustrated in Patent Reference 1 or the like in the following procedure.

That is, in the tire testing apparatus of Patent Reference 1, the tire flowing from the upstream of an inspection line is sandwiched by rims divided into upper and lower parts, and the tire is inflated in a short time and fixed between the upper and lower rims. After that, by setting the internal pressure of the tire to a test pressure, the rotary drum is pressed against the tire held at the test pressure and is rotated normally or reversely to measure the tire uniformity.

When measuring the tire uniformity in this way, it is necessary to accurately grasp a relation between the pressing position of the tire and the tire load and to correctly generate the target pressing load on the tire. For this purpose, a "load model" illustrating the relation between the pressing position of the tire and the tire load is built, and the tire testing apparatus is controlled, while using the built load model to perform the uniformity test of the tire.

For example, Patent Reference 2 adopts a "spring deformation model" in which a pressing position of a tire and a measured value of a tire load linearly change as a load model for controlling a tire testing apparatus. That is, in the load model of Patent Reference 2, there is disclosed a method for actually measuring the relation between the pressing position and the tire load in advance, calculating the spring constant from the actually measured value, and controlling the pressing load on the assumption that the calculated spring constant is constant.

CITATION LIST

Patent Reference
  Patent Reference 1: JP-B-H06-95057
  Patent Reference 2: JP-A-2013-124858

SUMMARY OF THE INVENTION

Problems that the Invention is to Solve

Meanwhile, the load model used in Patent Reference 2 is configured to calculate the tire load from the pressing position of the tire with respect to the rotary drum on the assumption that the spring constant is constant. Therefore, in Patent Reference 2, the spring constant is calculated using the measurement data of the tire load measured at the two pressing positions, and the tire load is obtained using the calculated spring constant.

However, the true spring constant is easily affected by the disturbance component, and there is a possibility that the error of the true spring constant is large with the spring constant calculated as a constant. Therefore, according to the method of Patent Reference 2, as a result of using a load model including an error, it is not possible to perform the uniformity measurement with the target pressing load, and there is a possibility that it is difficult to accurately calculate the tire load.

Further, if the spring constant deviates from the true spring constant for the above-mentioned reason, it is necessary to repeat recalculation of the spring constant, the measurement time of uniformity becomes longer, and as a result, there is also a possibility that the productivity of the inspection line may be reduced.

Further, in Patent Reference 2, only the drum pressing position is considered as a factor affecting the spring constant. In fact, however, the factor affecting the spring constant is not limited to the drum pressing position, but the spring constant may vary depending on the pressure of the air flowing into the tire. Therefore, even if the air pressure in the tire deviates from a predetermined test pressure, the load model may not be accurate and the spring constant may not be accurately obtained.

The present invention has been made in view of the above problem, and an object thereof is to provide a method for estimating a load model in a tire uniformity testing apparatus which is capable of estimating a load model that can accurately calculate a tire load on the basis of a drum pressing position.

Means for Solving the Problems

In order to solve the above problem, the load model estimating method in the tire uniformity testing apparatus of the present invention takes the following technical means.

That is, a method for estimating a load model in a tire uniformity testing apparatus of the present invention is a method for estimating a load model in a tire uniformity testing apparatus which measures uniformity of the tire by measuring a load generated on the tire pressed against a rotating rotary drum, the method being used to control a pressing position of a rotary drum and to estimate a load model which expresses a relation between the pressing position of a tire with respect to the rotary drum and a tire load generated on the tire, and including: sequentially measuring the tire load, while changing the pressing position of the tire with respect to the rotary drum; and estimating the load model, using the measured value of the tire load.

Further, it is preferable to further include weighing the measured value of the tire load so as to increase the weight as it approaches the target value of the tire load; and estimating the load model using the measured value of the weighted tire load.

Further, it is preferable to adopt a load estimation formula in which the pressing position of the tire and the tire load linearly change as the load model, the load estimation formula may be fitted to the weighted measured value, and the load model may be estimated by obtaining a spring constant from a slope of the load estimation formula after the fitting.

Further, it is preferable to further include building a load estimation formula considering the parameters of the tire as a nominal model in addition to the pressing position of the tire on the rotary drum; correcting the pressing position of the tire in the nominal model, using a deviation between a target pressing position calculated by the nominal model and a pressing position actually measured for each of the tires; and estimating the load model using the corrected pressing position.

Advantages of the Invention

According to the method for estimating a load model in the tire uniformity testing apparatus of the present invention, it is possible to estimate a load model that can accurately calculate the tire load based on the drum pressing position.

MODES FOR CARRYING OUT THE INVENTION

First Embodiment

Hereinafter, an embodiment of a method for estimating a load model according to the present invention will be described in detail with reference to the drawings.

First, prior to the description of the method for estimating the load model, a tire uniformity testing apparatus 1 that controls the pressing position of the rotary drum using the load model estimated by the estimating method will be described.

Figure 1:
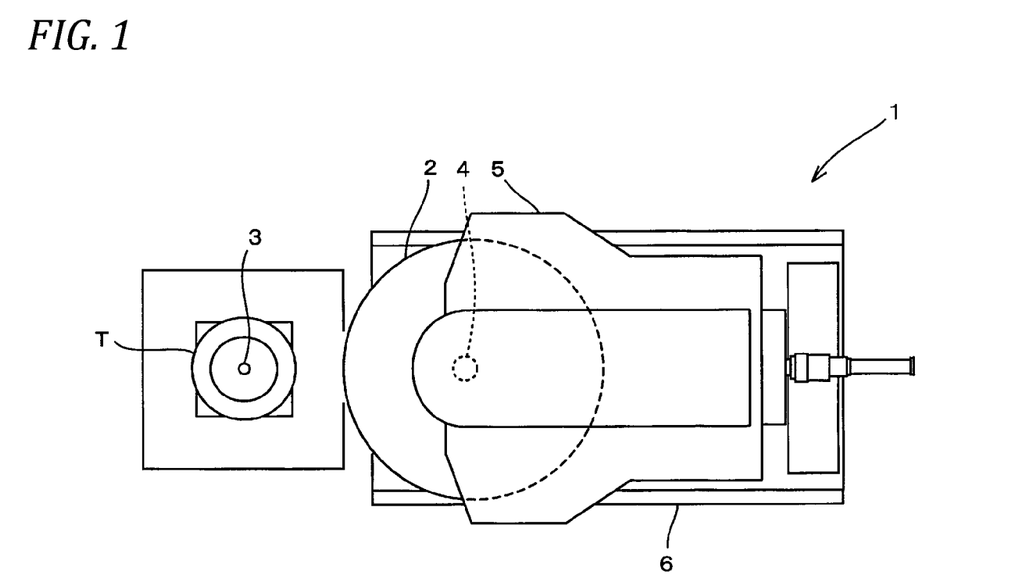
FIG. 1 is a plan view illustrating a tire uniformity testing apparatus on which a load model is estimated using an estimating method of the present invention.

FIG. 1 schematically illustrates the tire uniformity testing apparatus 1. As illustrated in FIG. 1, the tire uniformity testing apparatus 1 of a first embodiment is configured to evaluate the tire uniformity of a product tire T, for example, radial force variation (RFV) of a tire or the like.

Specifically, the tire uniformity testing apparatus 1 of the first embodiment includes a cylindrical rotary drum 2 which is provided so that an axis thereof faces upward and downward, and a tire shaft 3 which is attached to be freely rotatable around a shaft parallel from the axis of the rotary drum 2.

Figure 2:
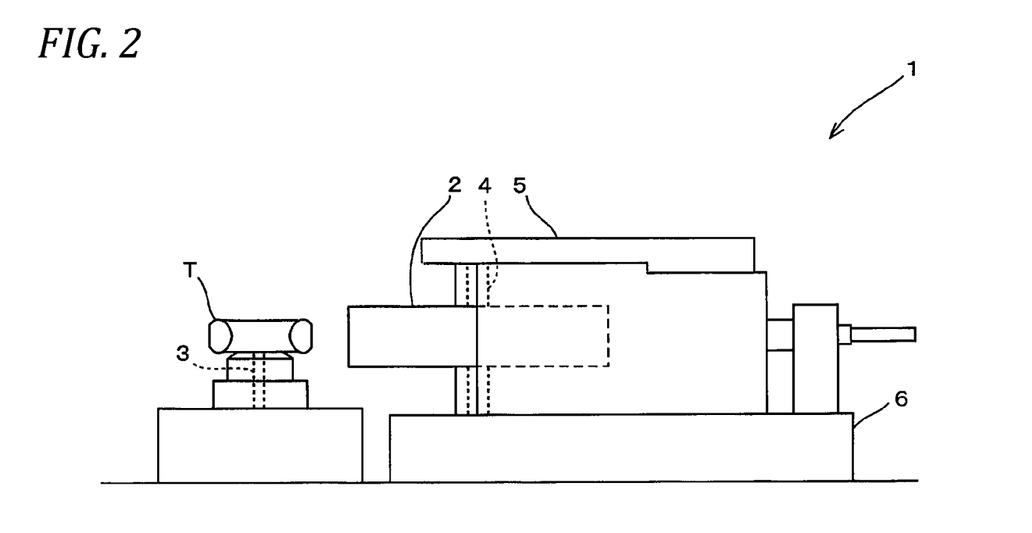
FIG. 2 is a front view of the tire uniformity testing apparatus of the present invention.

The rotary drum 2 has an outer peripheral surface serving as a tire testing simulated road surface, and is rotatably supported by a rotary shaft 4 having a vertical axis. The rotary shaft 4 is supported by the frame member 5. The rotary drum 2 is formed into a cylindrical shape having a short length and a large diameter in which a dimension in a vertical direction is shorter than a length in a radial direction, and the rotary shaft 4 is provided at the center thereof. The frame member 5 has a pair of upper and lower support frames provided so as to protrude in the horizontal direction, and the rotary shaft 4 can be supported between the pair of upper and lower support frames so as to bridge the rotary shaft 4 in the vertical direction.

Between the rotary shaft 4 and the frame member 5, a load measuring unit (not illustrated) is provided to be capable of measuring a load or a moment generated on the rotary shaft 4 when the rotary drum 2 is pressed against the tire T. The frame member 5 (support frame) supports the rotary shaft 4 via the load measuring unit. The load measuring unit of the present embodiment is attached to the rotary shaft 4 of the rotary drum 2, but the load measuring unit can also be attached to the tire shaft 3 described later to measure the load generated on the tire shaft 3.

Further, on the lower side of the frame member 5, there is provided a drum moving unit 6 capable of horizontally moving the rotary drum 2 with respect to a foundation. By using the drum moving unit 6, the rotary drum 2 can approach and separate from the tire shaft 3. By moving the rotary drum 2 by the drum moving unit 6 as described above, the tire T held at the test pressure is pressed against the rotary drum 2.

The tire shaft 3 is a rod-like member provided along the vertical direction. On the lower side of the tire shaft 3, a rotation unit (not illustrated) for rotating the tire shaft 3 about the vertical axis is provided. Further, on the upper end side of the tire shaft 3, a rim member (not illustrated) capable of fixing the tire T as the measurement object is provided. The tire T can be fixed to the tire shaft 3 using the rim member.

Incidentally, when tire uniformity is measured using the aforementioned tire uniformity testing apparatus 1, compressed air supplied from a factory air source is pressure-adjusted and then is supplied to the tire T attached to the tire shaft 3. Specifically, the tire uniformity testing apparatus 1 is provided with an air supply mechanism (not illustrated) for supplying compressed air to the interior of the tire T fixed to the tire shaft 3, and the tire T can be inflated using the compressed air that is supplied by the air supply mechanism.

The air supply mechanism includes a bead seat system for inflating the tire T with a test pressure, and a test system for setting the internal pressure of the tire T to a predetermined tire pressure. Further, in the tire uniformity testing apparatus 1, the tire T is inflated in a short time using piping of the bead seat system, and then is fixed between the upper and lower rims. Then, the air pressure inside the tire is kept at the test pressure with the compressed air from the test system which is another piping, and the above-described rotary drum 2 is pressed against the tire T held at the test pressure to rotate in the forward direction and to measure the tire uniformity. After that, the tire T is reversed and the tire uniformity in the reverse direction is also measured.

In this way, the load at the time of pressing the rotary drum 2 against the tire T to rotate is measured by the load measuring unit attached to the rotary shaft 4 of the rotary drum 2, and it is possible to evaluate the tire uniformity from the fluctuation of the load measured by the load measuring unit.

Incidentally, since the above-described tire uniformity is measured when the rotary drum 2 is accurately pressed against the tire T with the target pressing load, it is extremely important to exactly apply the target pressing load to the tire T during the tire uniformity test upon accurately measuring the tire uniformity.

Therefore, in the control device of the tire uniformity testing apparatus according to the related art, a load model for estimating the tire load applied to the tire is incorporated in advance as illustrated in the formulas (1) and (2), the pressing position of the rotary drum capable of exhibiting a desired tire load is calculated using the incorporated load model, and the pressing position of the rotary drum is controlled so as to be the calculated pressing position.

[Formula 1]

$$K_n = \frac{F_n^a - F_n^b}{d_n^a - d_n^b} = \frac{\Delta F_n}{\Delta d_n} \qquad (1)$$

Here, $K_n$: spring constant (existing method), n: subscript of measured number of spring constant $F_n^a$: load value at a point a at the time of n-th measurement, $F_n^b$: load value at a point b at the time of n-th measurement $d_n^a$: drum position at a point a at the time of n-th measurement, $d_n^b$: drum position at a point b at the time of n-th measurement $\Delta F_n$: difference in load value at the time of n-th measurement, $\Delta d_n$: difference in drum position at the time of n-th measurement

[Formula 2]

$$d_G = \frac{F_G}{K_n} + d_0 \qquad (2)$$

Here, $K_n$: spring constant (existing method), $F_G$: target load value $d_G$: target drum position, $d_0$: drum position during non-load (original position)

However, in the load model (for example, the technique in the above-mentioned Patent Reference 2) used in the tire uniformity testing apparatus according to the related art, the spring constant is calculated using the measured data of the tire load measured at the two pressing positions, and the tire load is obtained using the calculated spring constant. Accordingly, there is a possibility that the error is large and it is difficult to accurately calculate the tire load.

Therefore, according to the load model estimating method of the present invention, the tire load is sequentially measured, while changing the pressing position of the rotary drum 2 with respect to the tire T, and the measured value of the tire load sequentially measured is weighted to increase the weight as the measured value approaches the target value of the tire load, and the load model is estimated using the weighted measured value. Then, as a load model, a load estimation formula in which the pressing position of the tire T and the tire load linearly change is adopted, the load estimation formula is fitted to the weighted measured value, and the spring constant is obtained from the slope of the load estimation formula after fitting, thereby estimating the load model.

That is, it is not thought that linearity of the load model adopted in the estimating method of the present invention is established with respect to all data at the pressing position over a wide range, but it is thought that the linearity is emphatically established with respect to the partial pressing position which is a target value of the tire load.

Figure 5:
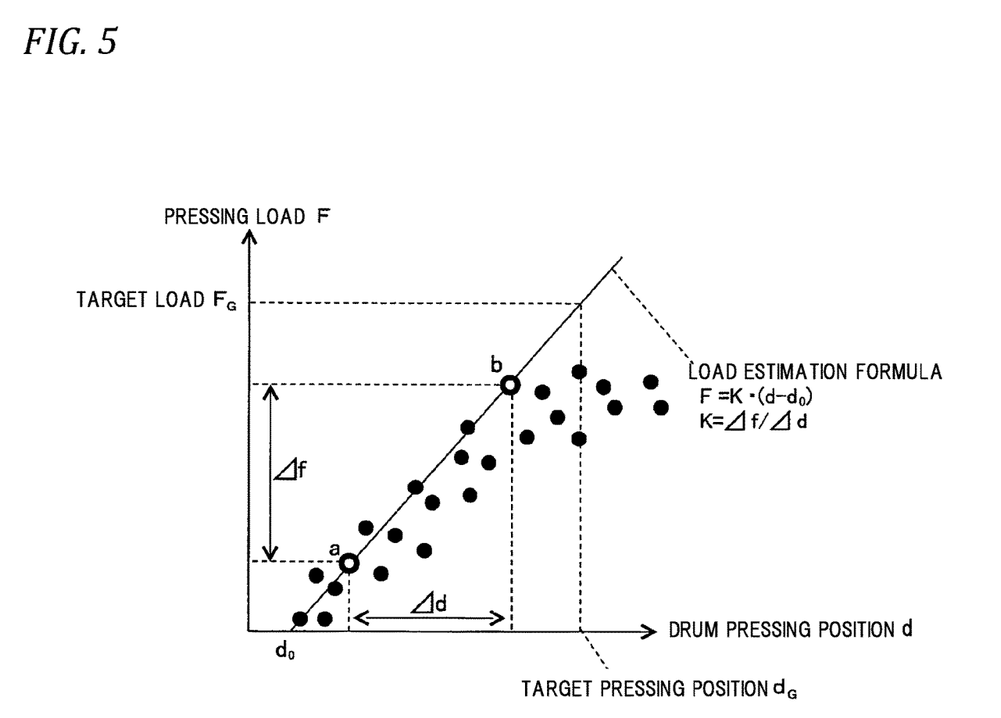
FIG. 5 is an explanatory view illustrating an existing method of estimating a load model.

For example, as illustrated in FIG. 5, when paying attention to all the tire loads from a region in which the pressing position of the rotary drum 2 is small (a region in which the pressing of the rotary drum 2 is weak) to a region in which the pressing position is large (a region in which the pressing of the rotary drum 2 is strong), there is also a case where the measured value of the tire load indicated by "black circle" in FIG. 5 changes so as to gently bend, and the difference between the load estimation formula as illustrated in the FIG. 5 and the actual tire load increases.

However, the vicinity of the region (target pressing position) in which the pressing position of the rotary drum 2 is large is really important, and it is important to estimate (obtain an accurate spring constant) an accurate load model which expresses the relation between the pressing position of the tire T against the rotary drum 2 and the tire load in the region.

Therefore, in the load model of the present invention, it is possible to accurately estimate the tire load, by preferentially using the measured value in the vicinity of the "target pressing load" such that a linear relation with the tire load is established.

Figure 6:
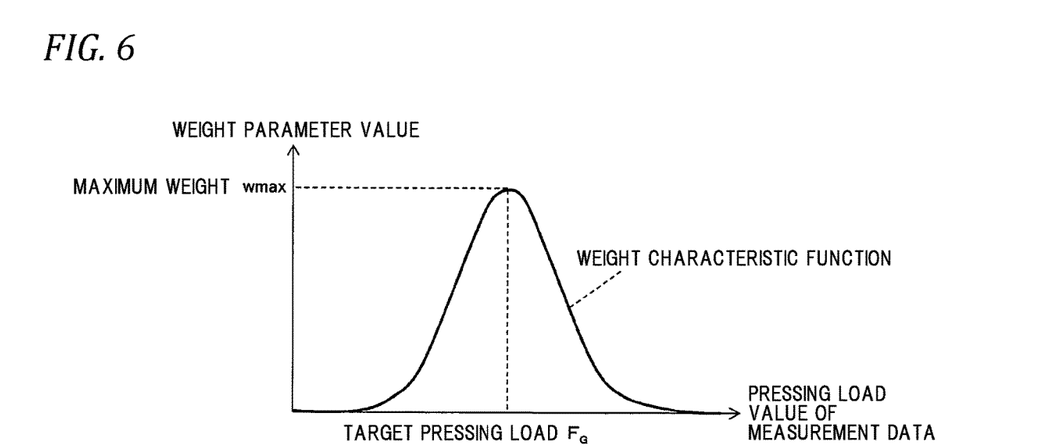
FIG. 6 is an explanatory view illustrating an example of a weight characteristic function that weights a measured value of a tire load.
Figure 7:
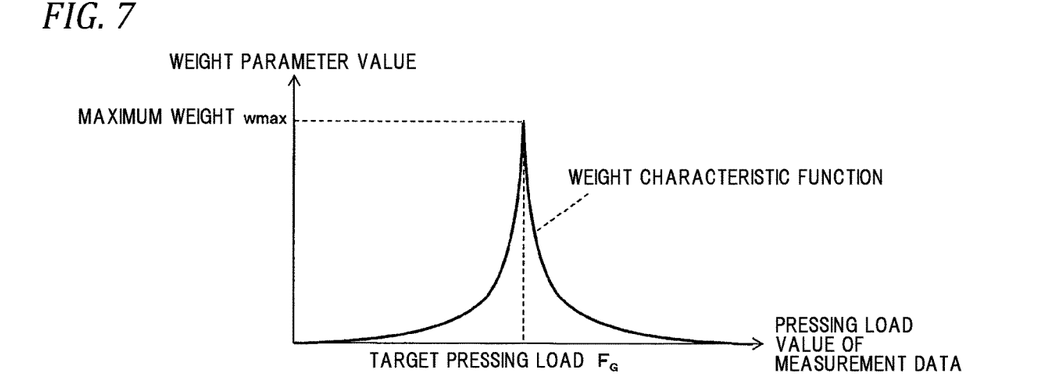
FIG. 7 is an explanatory view illustrating another example of a weight characteristic function that weights the measured value of the tire load.
Figure 8:
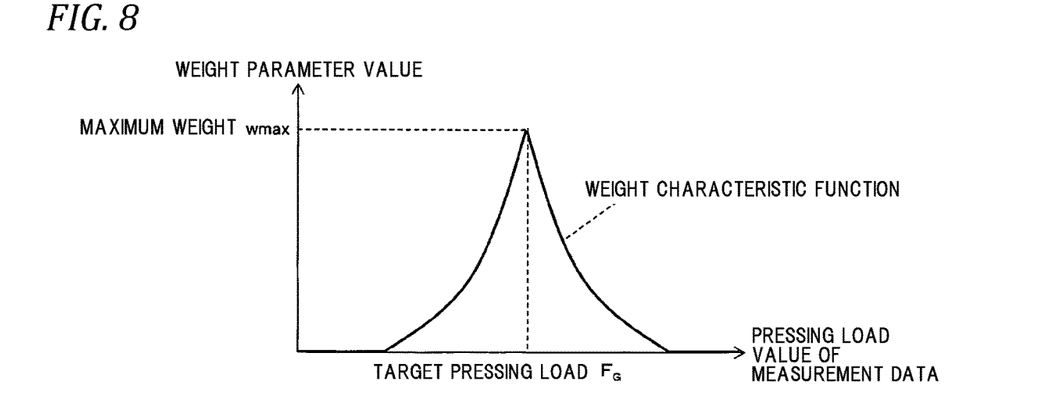
FIG. 8 is an explanatory view illustrating still another example of a weight characteristic function that weights the measured value of the tire load.

Specifically, in the estimating method of the present invention, the measured value of the tire load measured by the above-described load measuring unit is processed by any one of the weight characteristic functions as illustrated in FIGS. 6 to 8 and is weighted, such that the spring constant can be obtained (the load model can be estimated), by preferentially using measurement data in a range in which a linear relation is established between the pressing position of the rotary drum 2 and the tire load.

The weight characteristic functions illustrated in FIGS. 6 to 8 are functions that can obtain the maximum weight wmax when the tire load measured by the load measuring unit becomes the "target pressing load", and are functions which become zero as the weight abruptly decreases to zero when the tire load deviates from the "target pressing load". Therefore, if the measured value of the tire load measured by the load measuring unit is processed with the weight characteristic functions as illustrated in FIGS. 6 to 8, it is possible to preferentially use the measured value located in the vicinity of the "target pressing load".

Figure 3:
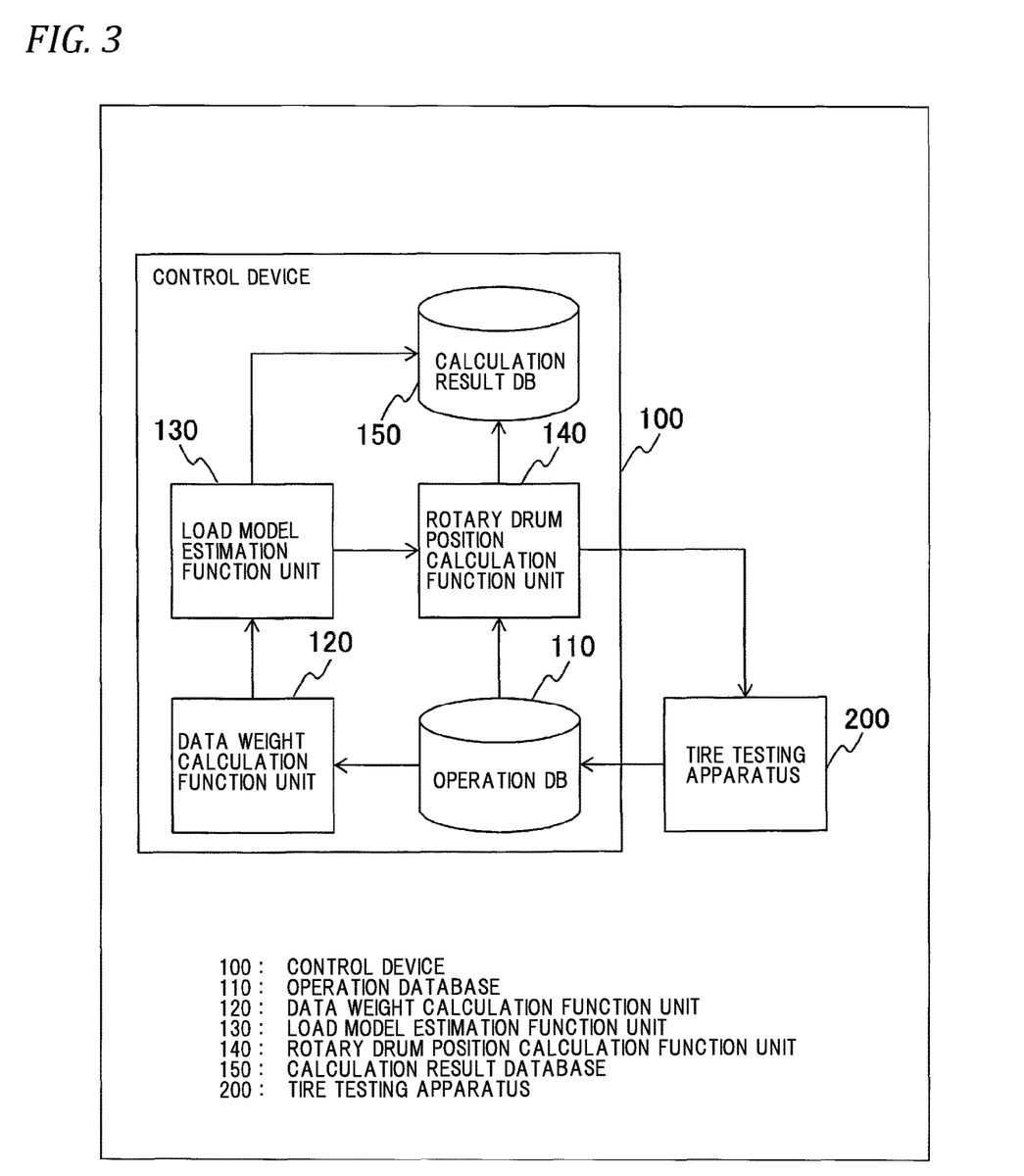
FIG. 3 is a block diagram of a control device that performs the estimating method of the first embodiment.
Figure 4:
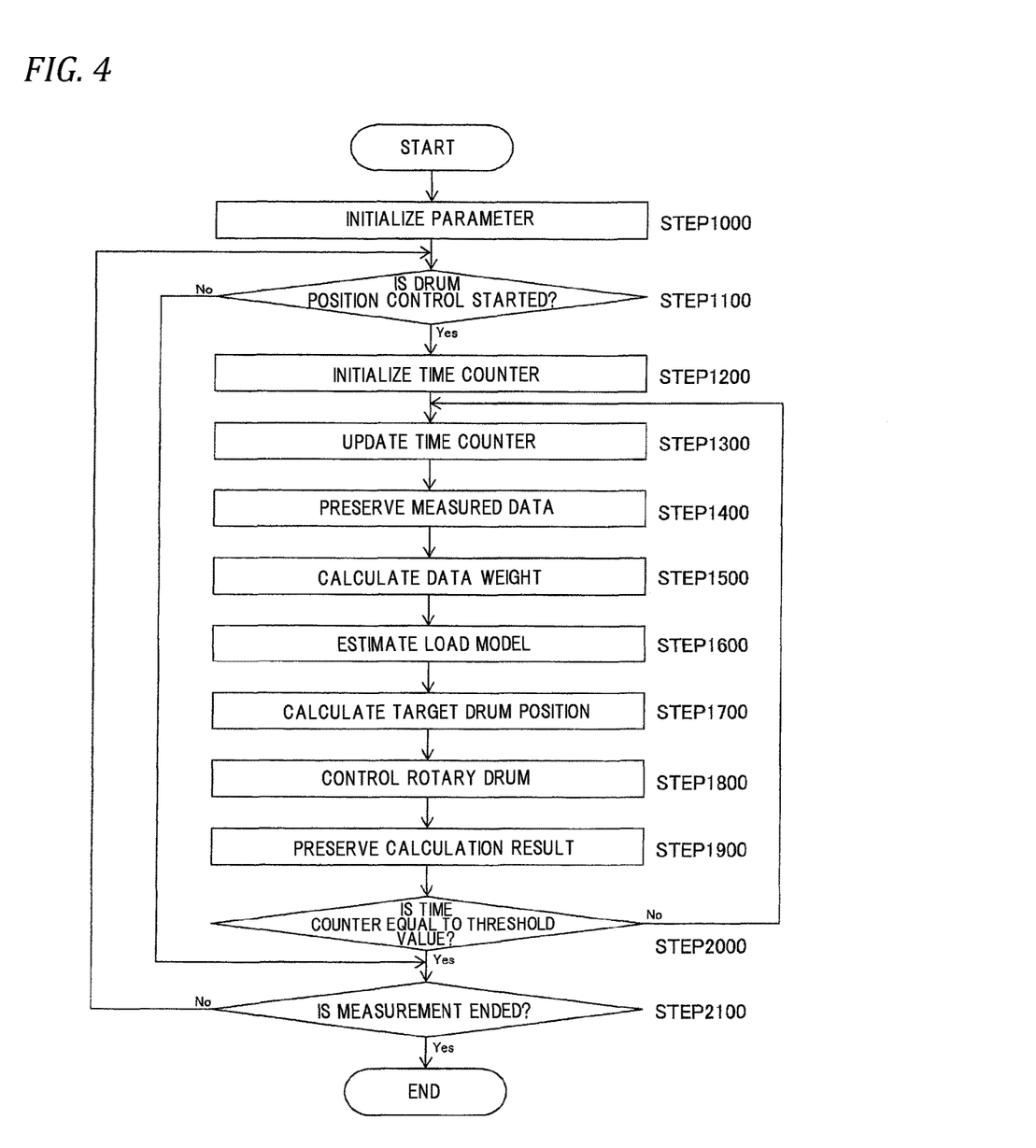
FIG. 4 is a flowchart illustrating a processing procedure of the estimating method of the first embodiment.

The above-described weighting is performed by using a control device that processes signals according to the block diagram illustrated in FIG. 3. The control device is actually made up of a computer such as a personal computer which is attached to the tire uniformity testing apparatus 1. Within this computer, signals are processed in accordance with a flowchart (program) as illustrated in FIG. 4.

Next, with reference to FIGS. 3 and 4, a signal processing method performed by the control device of the first embodiment, in other words, a method of estimating a load model of the first embodiment will be described.

The aforementioned control device estimates a load model, using the tire load measured by the load measuring unit of the tire uniformity testing apparatus 1 and the measurement result of the pressing position of the rotary drum 2, and controls the pressing position of the rotary drum 2, using the estimated load model.

Specifically, when the measurement of the tire uniformity is started by the tire uniformity testing apparatus 1, the parameters calculated in the past are initialized (STEP 1000), and the control of the rotary drum position is started (STEP 1100). When the rotary drum 2 moves to a certain pressing position and the tire load is measured, the measured value of the tire load and the pressing position of the rotary drum 2 is output to the "operation DB 110" of the "control device 100".

The data of the measured value which is input to the "operation DB 110" is sent to the "data weight calculation function unit 120" and to the "rotary drum position calculation function unit 140".

In the "data weight calculation function unit 120", "initialization of the time counter" (STEP 1200), "update of the time counter" (STEP 1300), "storage of the measurement data" (STEP 1400) and the like are appropriately performed (STEP 1200 to STEP 1400) as needed, and the measured value of the tire load is weighted, using the data of the pressing position of the rotary drum 2 sent from the "operation DB 110" (STEP 1500).

Specifically, as illustrated in the formulas (3) to (5), the weight function previously stored in the control device is applied to the data of the measured value which is input from the "operation DB 110". Then, a weight is given depending on whether or not the pressing position of the rotary drum 2 is located in the vicinity of the "target pressing load". When the pressing position is a value close to the "target pressing load", a large weight is applied, and when the pressing position is a value is far from the "target pressing load", a weight close to zero is given.

[Formula 3]

$$w(t) = w_{max} \cdot \exp\left\{-\frac{(F(t) - F_G)^2}{r^2}\right\} \quad (3)$$

Here, $w_{max}$: weight parameter maximum value (arbitrarily settable)
r: parameter which controls width of weight characteristic function (arbitrarily settable)

[Formula 4]

$$w(t) = \frac{1}{|F(t) - F_G + \alpha| \times w_{max}} \quad (4)$$

Here, $\alpha$: parameter which controls width of weight characteristic function (arbitrarily settable)

[Formula 5]

$$w(t) = \begin{cases} w_{max} \cdot \exp\left[\frac{F(t) - F_G}{c}\right] & (F(t) < F_G) \\ w_{max} \cdot \exp\left[-\frac{F(t) - F_G}{c}\right] & (F(t) \geq F_G) \end{cases} \quad (5)$$

Here, c: parameter which controls width of weight characteristic function (arbitrarily settable)

As described above, the measured value of the tire load weighted by the "data weight calculation function unit 120" is sent to the "load model estimation function unit 130" as illustrated in FIG. 3, and the estimation of the load model is performed in the "load model estimation function unit 130" (STEP 1600).

Specifically, in the "load model estimating function 130", it is assumed that linearity is established between the measured value of the weighted tire load and the position of the rotary drum 2, and the "spring constant" is calculated using the formulas (6) to (11). The formulas (6) to (11) show a method of estimating the load estimation formula using the sequential least squares method or the like. That is, formulas (6) to (9) sequentially update the matrix Y and the matrix Z to estimate the load estimation formula, and formulas (10) and (11) show a method for estimating the load estimation formula using an orthodox sequential least squares method. The "spring constant" calculated in this manner is calculated emphatically using the measured value in the vicinity of the "target pressing load" and can accurately estimate the tire load.

[Formula 6]

$$\hat{F} = \hat{K}(t) \cdot d + \hat{C}(t) \quad (6)$$

Here, $\hat{K}(t)$: estimated spring constant at time t
$\hat{C}(t)$: estimated offset parameter at time t

[Formula 7]

$$Y(t) = Y(t-1) \cdot d + w(t)^2 \begin{bmatrix} d(t)^2 & d(t) \\ d(t) & 1 \end{bmatrix} \quad (7)$$

[Formula 8]

$$Z(t) = Z(t-1) \cdot d + w(t)^2 \cdot F(t) \begin{bmatrix} d(t) \\ 1 \end{bmatrix} \quad (8)$$

[Formula 9]

$$\begin{bmatrix} \hat{K}(t) \\ \hat{C}(t) \end{bmatrix} = Y(t)^{-1} \cdot Z(t) \quad (9)$$

Here, $d(t)$: drum position at time $t$
$F(t)$: pressing load at time $t$
$w(t)$: weight parameter value at time $t$

[Formula 10]

$$\begin{bmatrix} \hat{K}(t) \\ \hat{C}(t) \end{bmatrix} = \begin{bmatrix} \hat{K}(t-1) \\ \hat{C}(t-1) \end{bmatrix} + \frac{w(t)^2 \cdot P(t-1)\begin{bmatrix} d(t) \\ 1 \end{bmatrix}(F(t) - \hat{K}(t-1) \cdot d(t) - \hat{C}(t-1))}{1 + w(t)^2 \cdot [d(t)]1 P(t-1)\begin{bmatrix} d(t) \\ 1 \end{bmatrix}} \quad (10)$$

[Formula 11]

$$P(t) = P(t-1) - \frac{w(t)^2 \cdot P(t-1)\begin{bmatrix} d(t)^2 & d(t) \\ d(t) & 1 \end{bmatrix} P(t-1)}{1 + w(t)^2 \cdot [d(t)]1 P(t-1)\begin{bmatrix} d(t) \\ 1 \end{bmatrix}} \quad (11)$$

Here, $P(t)$: covariance matrix at time $t$

The load model estimated in this way is sent to the "calculation result DB 150" and stored (STEP 1900), and is sent to the "rotary drum position calculation function unit 140".

In the "rotary drum position calculation function unit 140", the target position of the rotary drum 2 is calculated, using the estimation result of the load model sent from the "data weight calculation function unit 120" and the pressing position of the rotary drum 2 which is input via the "operation DB 110" (STEP 1700). The target position of the rotary drum 2 calculated by the "rotary drum position calculation function unit 140" is output again to the "tire uniformity testing apparatus 200", and the position of the rotary drum 2 is controlled by the "tire uniformity testing apparatus 200" according to the formula (12) (STEP 1800).

[Formula 12]

$$\hat{d}_G = \frac{F_G - \hat{C}(t)}{\hat{K}(t)} \qquad (12)$$

Here, $\hat{d}_G$: estimated value of target drum position
$F_G$: target pressing load In this way, the target position of the rotary drum 2 calculated by the "rotary drum position calculation function unit 140" and the calculation result of the load model are sent to the "calculation result DB 150" and stored (STEP 1900).

By repeating the series of calculations described above until the time counter reaches a predetermined time (STEP 2000), the pressing position of the rotary drum 2 can be accurately controlled. In other words, if a series of calculations are performed according to the operation of pressing the rotary drum 2 against the tire T, the position of the rotary drum 2 is precisely controlled by using a plurality of measurement data, and the tire uniformity can be accurately measured. When the time counter reaches a predetermined time (STEP 2000), then in STEP 2100 it determines if the measurement (series of calculations) ends. If "Yes" in STEP 2100, then the measurement ends.

According to the load model estimated by the load model estimating method of the first embodiment described above, the tire load can be accurately estimated based on the pressing position of the rotary drum 2.

Figure 9:
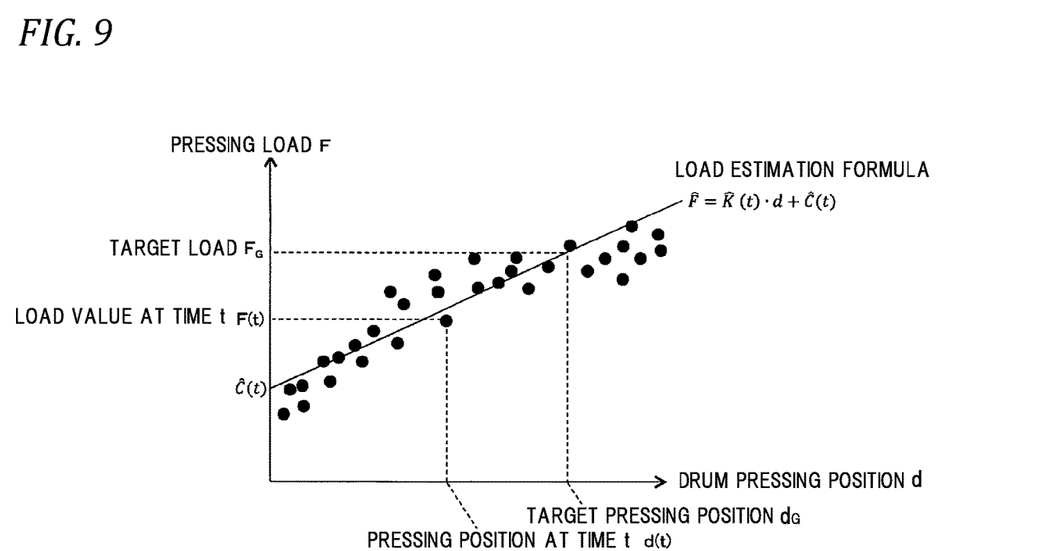
FIG. 9 is an explanatory view illustrating a method of estimating a load model without weighting (an estimating method of a comparative example).

For example, as illustrated in FIG. 9, when estimating a load model using data of all measured values, for a load estimation formula that is linearly rising to the right, the measurement data is distributed to gently curve upward. Therefore, when the pressing position of the rotary drum is large, in other words, in the measured value in the vicinity of the "target pressing load", the distribution of the measurement data and the load estimation formula do not particularly match.

Figure 10:
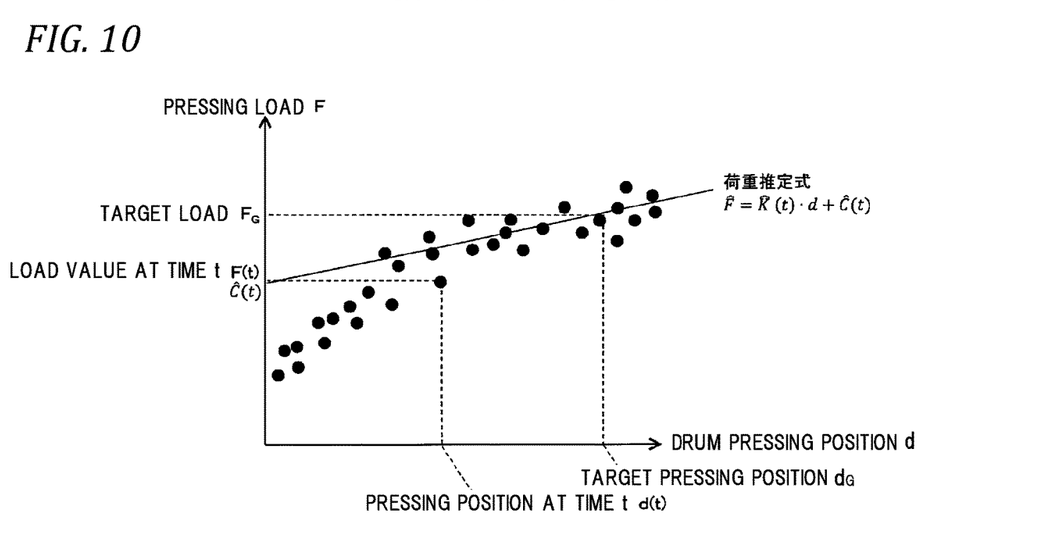
FIG. 10 is an explanatory view illustrating the method of estimating a load model according to the first embodiment.

However, as illustrated in FIG. 10, if weighting that increases the weight as it comes closer to the "target pressing load" is added to the measured value of the tire load using the weight characteristic function as in the present embodiment, the distribution of measurement data and the load estimation formula are likely to match. As a result, it is possible to accurately estimate the tire load using the load model, and eventually to measure the tire uniformity with high accuracy.

Second Embodiment

Next, a method of estimating a load model according to the second embodiment will be described.

As illustrated in FIGS. 11 to 14, in the load model estimating method of the second embodiment, as a load estimation formula for estimating the load model, a function that takes into consideration the influence of variables other than the pressing position such as pressure is also built and used as a nominal model. However, since the influence of pressure or the like affect not only the load estimation formula but also the pressing position which is a variable, it is not possible to accurately estimate the load model simply by using the nominal model.

Therefore, in the load estimation formula of the second embodiment, not only the data of the pressing position actually measured for each tire is used at the pressing position used for the load estimation formula, but also the pressure itself, the product of the pressure and the pressing position, the product of a power of pressure and the pressing position, etc. are used as explanatory variables of the nominal model, and the load is estimated in consideration of nonlinearity. By correcting the pressing position in consideration of such pressure influence and nonlinearity and using it in addition to the nominal model, it is possible to greatly improve the expressive ability of the load characteristic as compared with the case of only the spring constant, and it is possible to more accurately estimate the tire load using the load model.

That is, in the first embodiment, a load estimation formula in which the pressing position of the tire T and the tire load linearly change has been described as an example. However, the tire load also varies depending on the parameters of the tire T and the conditions for measuring the tire uniformity, and in practice, it is necessary to estimate the load estimation formula in consideration of the influence of these conditions.

Specifically, in the estimating method of the second embodiment, a load model as illustrated by the following formula (13) is prepared in advance as a nominal model. The nominal model prepared in advance is not only a pressing position but also a function of, for example, pressure (air pressure of the tire), and the like, and the value prepared in advance is accumulated in the nominal model DB. Further, as variables given to the nominal model selected from the nominal model DB, variables considering factors such as air pressure inside the tire are used.

For example, when considering the air pressure inside the tire as a factor influencing the tire load, the load estimation formula fitting is performed using the pressing position including the air pressure as a variable. By doing so, it is possible to perform fitting based on the load estimation formula in consideration of the influence of the internal pressure condition of the tire T, and the load model can be more accurately estimated.

Figure 11:
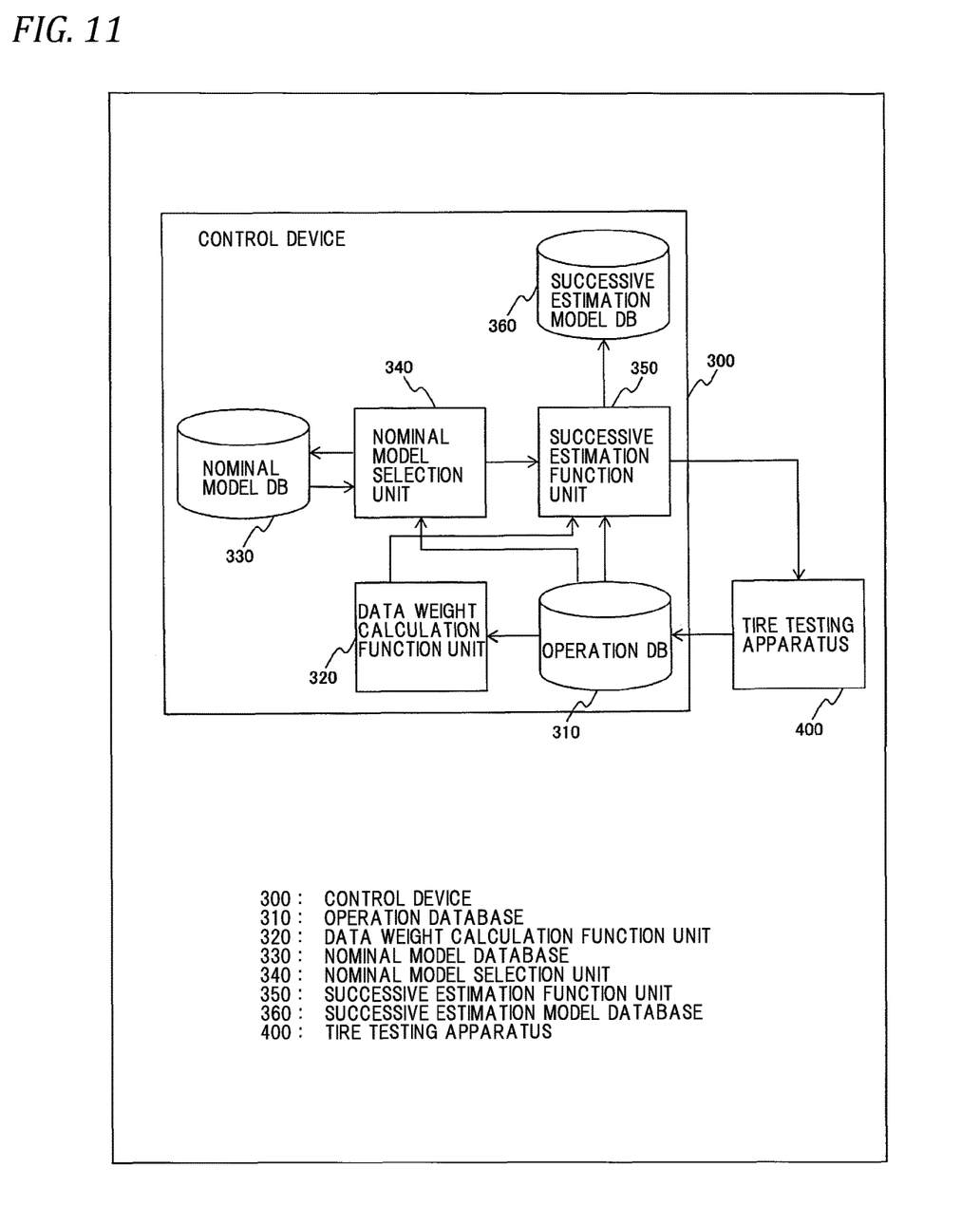
FIG. 11 is a block diagram of a control device that performs an estimating method of a second embodiment.

Specifically, as illustrated in FIG. 11, in the "control device 300" used in the estimating method of the second embodiment, the "operation DB 310", the "data weight calculation function unit 320", and the "tire uniformity testing apparatus 400, the "nominal model DB 330" in which the above-mentioned "nominal model" is accumulated and the "nominal model selecting unit 340" for selecting an optimum nominal model from the "nominal model DB 330" are provided.

Figure 12:
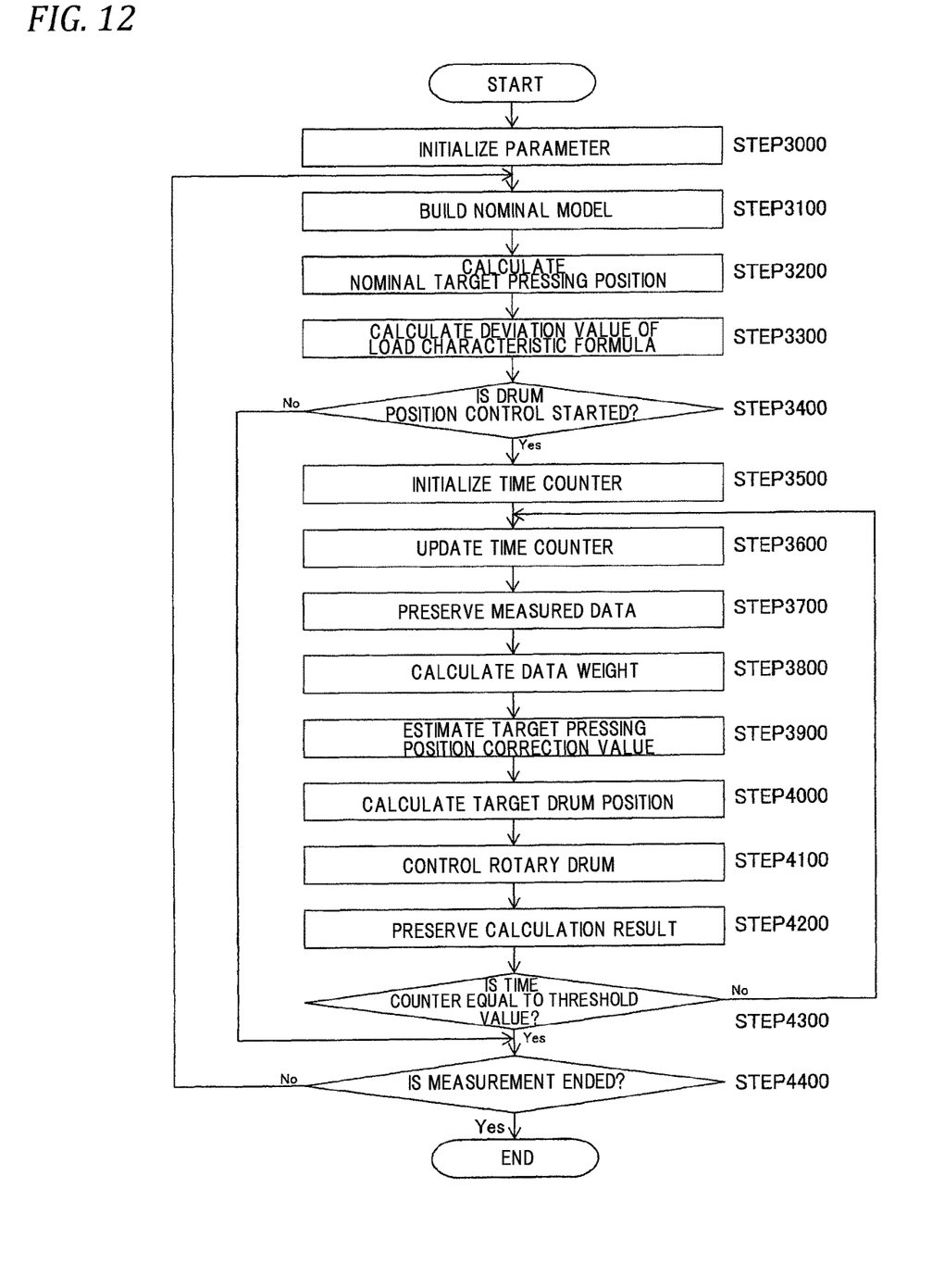
FIG. 12 is a flowchart illustrating a processing procedure of the estimating method of the second embodiment.

Then, when actually controlling the position of the rotary drum 2, prior to the operation (STEP 3400 to STEP 4300) of controlling the position of the rotary drum 2 by the method described in the first embodiment, the operations of creating the nominal model (STEP 3000 to STEP 3300) are preliminarily performed.

Figure 13:
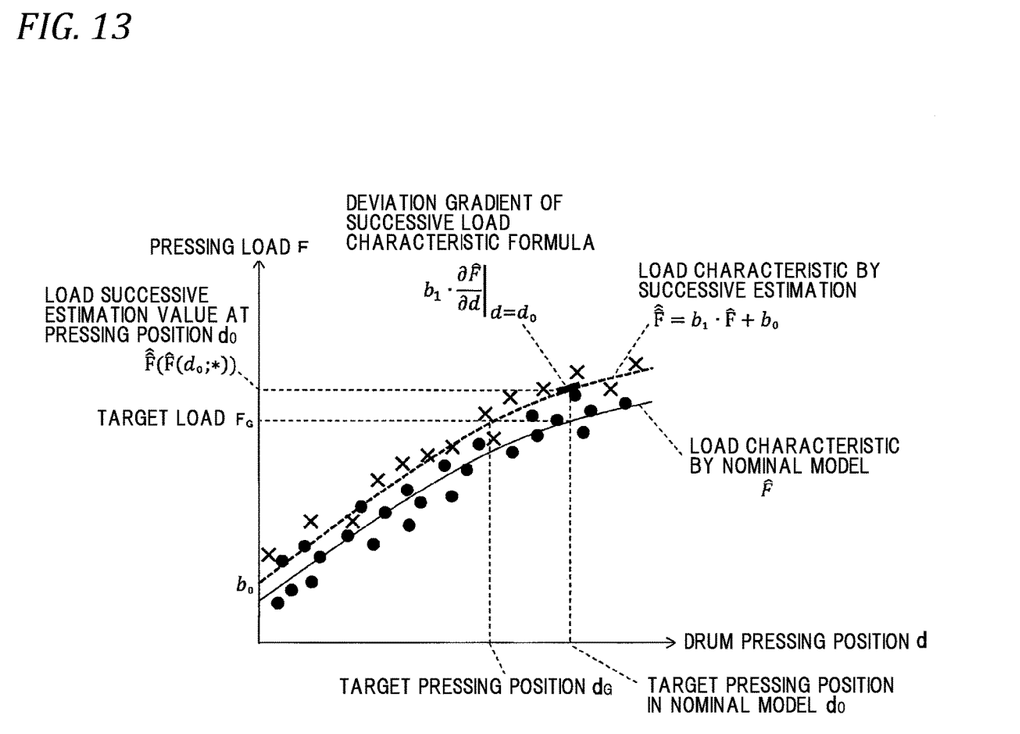
FIG. 13 is an explanatory view illustrating the method of estimating a load model according to the second embodiment.

In the operations of creating the nominal mode, if parameters such as the air pressure inside the tire T are known (STEP 3000), the estimated value of the pressing load given as a variable to the nominal model is first calculated according to the formula (13) (STEP 3100). After the estimated value of the pressing load of the nominal model is calculated in this way (STEP 3200), the deviation between the nominal model and the estimated value of the pressing load by the "successive estimation function unit 350" is calculated using the formula (14) (STEP 3300). As illustrated in FIG. 13, this deviation is calculated as the deviation (the coefficient parameter b0(t) in the formula) of the gradient of the load characteristic formula and the deviation (the coefficient parameter b1(t) in the formula) of the intercept. This calculation result is stored in the "successive estimation model DB 360". In the operations, when the control of drum position is started (STEP 3400), in the "data weight calculation function unit 320", "initialization of the time counter" (STEP 3500), "update of the time counter" (STEP 3600), "storage of the measurement data" (STEP 3700) and the like are performed as needed, and the measured value of the tire load is weighted, using the data of the pressing position of the rotary drum 2 sent from the "operation DB 310" (STEP 3800). Then, estimation of a target pressing position correction value is performed (STEP 3900). Then, the target position of the rotary drum 2 is calculated (STEP 4000) and the position of the rotary drum 2 is controlled by the "tire uniformity testing apparatus 400" (STEP 4100). In this manner, the calculated target position of the rotary drum 2 and the calculated result of the nominal model are stored (STEP 4200). By repeating the series of calculations described above until the time counter reaches a predetermined time (STEP 4300), the pressing position of the rotary drum 2 can be accurately controlled. When the time counter reaches a predetermined time (STEP 4300), then in STEP 4400 it determines if the measurement (series of calculations) ends. If "Yes" in STEP 4400, then the measurement ends.

[Formula 13]

$$\hat{F}(x(t)) = \sum_{i=1}^{|T|} a_i \cdot x_i(t) + a_0 \quad (13)$$

Here, $\hat{F}(x(t))$: pressing load estimation value of nominal model $x(t)$: explanation variable vector at time t*

$a_i, a_0$: coefficient parameter of nominal model $i \in 1$: subscript of explanation variable

* explanation variable preprocesses and generates operation data, and includes pressing position data d(t) (to give deviation of d) and pressure data in element.

[Formula 14]

$$\hat{F}(\hat{F}(x(t))) = b_1(t) \cdot \hat{F}(x(t)) + b_0(t) \quad (14)$$

Here, $\hat{F}(\hat{F}(x(t)))$: pressing load estimation value of successive estimation model $b_0(t), b_1(t)$: coefficient parameter of successive estimation model at time t In the load model estimating method according to the second embodiment, by successively estimating the above-described deviation (coefficient parameter b0(t) and coefficient parameter b1(t)) using formulas (15) to (19), the load estimation formula is estimated. In the second embodiment, a method for estimating the load estimation formula by sequentially updating the matrix Y and the matrix Z from the formulas (15) to (17) among the formulas (15) to (19) is also shown, and a method for estimating the load estimation formula using the orthodox sequential least squares method from the formulas (18) and (19) is also shown.

[Formula 15]

$$Y(t) = Y(t-1) \cdot d + w(t) \begin{bmatrix} \hat{F}(x(t))^2 & \hat{F}(x(t)) \\ \hat{F}(x(t)) & 1 \end{bmatrix} \quad (15)$$

[Formula 16]

$$Z(t) = Z(t-1) \cdot d + w(t) \cdot F(t) \begin{bmatrix} \hat{F}(x(t)) \\ 1 \end{bmatrix} \quad (16)$$

[Formula 17]

$$\begin{bmatrix} b_1(t) \\ b_0(t) \end{bmatrix} = Y(t)^{-1} \cdot Z(t) \quad (17)$$

[Formula 18]

$$\begin{bmatrix} b_1(t) \\ b_0(t) \end{bmatrix} = \begin{bmatrix} b_1(t-1) \\ b_0(t-1) \end{bmatrix} + \frac{w(t)^2 \cdot P(t-1) \begin{bmatrix} \hat{F}(x(t)) \\ 1 \end{bmatrix} (F(t) - b_1(t-1) \cdot \hat{F}(x(t)) - b_0(t-1))}{1 + w(t)^2 \cdot [\hat{F}(x(t)) \ 1] P(t-1) \begin{bmatrix} \hat{F}(x(t)) \\ 1 \end{bmatrix}} \quad (18)$$

[Formula 19]

$$P(t) = P(t-1) + \frac{w(t)^2 \cdot P(t-1) \begin{bmatrix} \hat{F}(x(t))^2 & \hat{F}(x(t)) \\ \hat{F}(x(t)) & 1 \end{bmatrix} P(t-1)}{1 + w(t)^2 \cdot [\hat{F}(x(t)) \ 1] P(t-1) \begin{bmatrix} \hat{F}(x(t)) \\ 1 \end{bmatrix}} \quad (19)$$

By substituting the deviation (coefficient parameter b0(t) and coefficient parameter b1(t)) thus calculated into the formulas (20) and (21), an accurate numerical value can be obtained as the target drum position estimated value.

Incidentally, the formulas (20) and (21) are based on the steepest descent method. That is, as long as the target pressing position in the nominal model, the target pressing position, the load successive estimated value at the pressing position, the target load, etc. can be calculated, the slope of the portion indicated by the bold line in FIG. 13 is obtained. In the steepest descent method, the deviation (dG–d0) at the drum pressing position or the deviation (FG–F0) at the pressing load are considered to be sufficiently small, and the slope of the bold line portion is considered to be equal to the deviation gradient of the sequential load estimation formula, and thus this deviation can be obtained.

[Formula 20]

$$\frac{\partial \hat{F}}{\partial d_{d=d_0}} = b_1 \frac{\partial \hat{F}}{\partial d_{d=d_0}} = \frac{\hat{F}(\hat{F}(d_0; *)) - F_G}{d_0 - d_G} \quad (20)$$

[Formula 21]

$$d_G = d_0 + \frac{F_G - \hat{F}(\hat{F}(d_0; *))}{b_1 \frac{\partial \hat{F}}{\partial d_{d=d_0}}} \quad (21)$$

Here, $$\frac{\partial \hat{F}}{\partial d_{d=d_0}}:$$

deviation gradient concerning pressing position in nominal model; when drum position is $d_0$ $d_0$: target drum position estimation value in nominal model $d_G$: obtained target drum position estimation value $\hat{F}(d_0;*)$: load estimation value of nominal model when drum position is $d_0$ $\hat{F}(d_G;*)$: load estimation value of nominal model when drum position is $d_G$ If the load model is estimated by the procedure described above, it is possible to fit the load estimation formula in consideration of influences such as the parameters of the tire T and the conditions for measuring the tire uniformity, and it is possible to estimate an accurate load model.

In the second embodiment described above, it is also possible to cope with a case where it is not possible to sufficiently estimate with the primary linear model of the first embodiment, in other words, a case where the load estimation taking nonlinearity into consideration is required.

It is to be understood that the embodiments disclosed this time are examples in all respects and are not restrictive. Particularly, in the embodiment disclosed this time, as items that are not explicitly disclosed, such as operating conditions, working conditions, various parameters, dimensions, weight, volume, etc. of components, etc., it is possible to adopt values that can be easily assumed by those skilled in the art, without departing from the scope normally practiced by those skilled in the art.

This application is based on Japanese patent application (2014-208109) filed on Oct. 9, 2014, the contents of which are incorporated herein by reference.

DESCRIPTION OF REFERENCE NUMERALS AND SIGNS

1: tire uniformity testing apparatus
2: rotary drum
100: control device
110: operation DB
120: data weight calculation function unit
130: load model estimation function unit
140: rotary drum position calculation function unit
150: calculation result DB
200: tire uniformity testing apparatus
300: control device
330: nominal model DB
340: nominal model selection unit
350: successive estimation function unit
360: successive estimation model DB

The invention claimed is:

1. A method for estimating a load model in a tire uniformity testing apparatus which measures uniformity of the tire by measuring a load generated on the tire pressed against the rotating rotary drum, the method being used to control a pressing position of a rotary drum and to estimate a load model which expresses a relation between the pressing position of a tire with respect to the rotary drum and a tire load generated on the tire and comprising:

sequentially measuring the tire load, while changing the pressing position of the tire with respect to the rotary drum;

estimating the load model using the measured value of the tire load;

weighing the measured value of the tire load so as to increase the weight as it approaches the target value of the tire load;

estimating the load model using the measured value of the weighted tire load;

wherein the load model adopts a load estimation formula in which the pressing position of the tire is expressed as a linear function of the tire load, the load estimation formula is fitted to the weighted measured values, and the load model is estimated by obtaining a spring constant from a slope of the load estimation formula after the fitting.

2. A method for estimating a load model in a tire uniformity testing apparatus which measures uniformity of the tire by measuring a load generated on the tire pressed against the rotating rotary drum, the method being used to control a pressing position of a rotary drum and to estimate a load model which expresses a relation between the pressing position of a tire with respect to the rotary drum and a tire load generated on the tire and comprising:

sequentially measuring the tire load, while changing the pressing position of the tire with respect to the rotary drum;

estimating the load model using the measured value of the tire load;

weighing the measured value of the tire load so as to increase the weight as it approaches the target value of the tire load;

estimating the load model using the measured value of the weighted tire load;

building a load estimation formula considering parameters of the tire as a nominal model in addition to the pressing position of the tire with respect to the rotary drum;

correcting the pressing position of the tire in the nominal model, using a deviation between a target pressing position calculated by the nominal model and the pressing position actually measured for the tire; and estimating the load model using the corrected pressing position.

* * * * *